US012445775B2

(12) United States Patent
Gagneur et al.

(10) Patent No.: US 12,445,775 B2
(45) Date of Patent: Oct. 14, 2025

(54) METHOD AND SYSTEM FOR PROCESSING A DIGITAL AUDIO SIGNAL TO IMPROVE THE RENDERING OF LOW FREQUENCIES

(71) Applicant: Faurecia Clarion Electronics Europe, Paris (FR)

(72) Inventors: Paul Gagneur, Poissy (FR); Benjamin Eller, Paris (FR)

(73) Assignee: FAURECIA CLARION ELECTRONICS EUROPE, Paris (FR)

( * ) Notice: Subject to any disclaimer, the term of this patent is extended or adjusted under 35 U.S.C. 154(b) by 243 days.

(21) Appl. No.: 18/454,494

(22) Filed: Aug. 23, 2023

(65) Prior Publication Data

US 2024/0073602 A1 Feb. 29, 2024

(30) Foreign Application Priority Data

Aug. 23, 2022 (FR) ..................................... 22 08459

(51) Int. Cl.
*H04R 3/00* (2006.01)
*H04R 1/02* (2006.01)
*H04R 3/08* (2006.01)
*H04R 9/06* (2006.01)
*H04R 29/00* (2006.01)

(52) U.S. Cl.
CPC ............... *H04R 3/08* (2013.01); *H04R 1/025* (2013.01); *H04R 9/06* (2013.01); *H04R 29/001* (2013.01); *H04R 2499/13* (2013.01)

(58) Field of Classification Search
CPC ........ H04R 3/007; H04R 29/001; H04R 3/08; H04R 1/025; H04R 9/06; H04R 3/04; H04R 2430/01; H03G 3/003; H03G 3/005
USPC .................................................... 381/59, 104
See application file for complete search history.

(56) References Cited

U.S. PATENT DOCUMENTS 9,837,971 B2 * 12/2017 Luo ........................... H03F 1/52
10,911,869 B2 * 2/2021 Mandell ................... H04R 3/02
11,109,155 B2 * 8/2021 Lindemann ............. H04R 3/04
(Continued)

FOREIGN PATENT DOCUMENTS

EP 2571286 A1 3/2013
WO 2018194990 A1 10/2018

OTHER PUBLICATIONS

French Search Report corresponding to FR 2208459, dated Mar. 27, 2023, 2 pages.

*Primary Examiner* — Disler Paul
(74) *Attorney, Agent, or Firm* — Reising Ethington P.C.

(57) ABSTRACT

A method implemented in an audio system including a transducer having a magnetic element suitable for generating vibrations based on the frequency of the audio signal. The method is implemented by one or more processing chains including: A) a high-pass filtering of the digital audio signal having a frequency greater than or equal to 10 Hz and less than two thirds of the specific cutoff frequency of the transducer; B) performing a first low shelf filtering with a predetermined first amplification gain; C) estimating an excursion value of the transducer for the signal obtained after applying the first low shelf filter; D) if the estimated excursion value of the transducer exceeds the maximum excursion value, calculating a second amplification gain that is less than the first gain; and E) applying a second low shelf filtering of gain equal to the second calculated gain.

11 Claims, 3 Drawing Sheets

(56) References Cited

U.S. PATENT DOCUMENTS

| | | | | |
|---|---|---|---|---|
| 11,234,075 | B2 * | 1/2022 | Meacham, II ....... | H04R 29/001 |
| 11,361,745 | B2 * | 6/2022 | Saux ...................... | H04R 1/406 |
| 11,641,557 | B2 * | 5/2023 | French ..................... | H04R 3/02<br>381/59 |
| 11,696,070 | B2 * | 7/2023 | Hodges ................ | H04R 29/001<br>381/55 |
| 2013/0230191 | A1 * | 9/2013 | Hoang Co Thuy ...... | H04R 3/08<br>381/104 |
| 2021/0258688 | A1 | 8/2021 | Meacham, II | |

* cited by examiner

METHOD AND SYSTEM FOR PROCESSING A DIGITAL AUDIO SIGNAL TO IMPROVE THE RENDERING OF LOW FREQUENCIES

TECHNICAL FIELD

The present invention relates to a method for processing a digital audio signal to improve the rendering of low frequencies, and to an associated system for processing a digital audio signal.

BACKGROUND

The invention belongs to the field of audio systems, and more particularly of audio systems for vehicles, in particular for passenger transport vehicles.

In this type of audio system, it is known to use various types of transducers to boost the rendering of audio signals, for example to listen to music. Such transducers include loudspeakers, which produce a sound wave in response to an electrical signal applied as input, integrated into the passenger compartment of a vehicle, for example of a motor vehicle, or integrated into the seat headrest in order to improve the sound rendering quality for each user. Furthermore, it has also been proposed to integrate vibrators, which are also transducers, in seats, for example motor vehicle seats, to improve the user experience by accompanying the sound rendering with corresponding vibrations.

Such a transducer includes a magnetic element capable of generating vibrations based on the frequency of the audio signal provided as input. For example, for a loudspeaker, the magnetic element consists of a coil, in which an electric current is passed, submerged in a magnetic field created by pole pieces and a magnet, the loudspeaker further comprising a diaphragm connected to the coil, the vibrations of which create the sound wave reproduced. The displacement of the diaphragm has an amplitude of displacement with respect to its equilibrium position, also referred to as excursion. For operation under good conditions, a maximum excursion is predefined. The reproduction of low frequencies of the audio signal by such a transducer is limited by a cutoff frequency, specific to each transducer.

With the aim of improving the sound reproduction quality for the user, it has been proposed to artificially increase the level of the audio signal in the low frequencies, by appropriate filtering of the audio, analog or digital signal.

However, it has been found that amplification of the signal level in the low frequencies has the effect of considerably increasing the excursion of the transducer, which causes the risk of reaching the maximum excursion value of the transducer, and consequently the damage or rupture of the diaphragm if the sound volume is increased by the user. This risk is all the greater when the transducer, for example the loudspeaker, is small, which is the case with transducers integrated into a seat headrest or into a mobile telephone.

Thus, it is useful to develop methods for improving sound reproduction while protecting against excessive excursions of the transducer diaphragm.

In particular, patent EP 2,571,286 B1 proposes a technique for dynamically reinforcing low frequencies in a sound reproduction installation, by applying an amplification filtering of the "low shelf" type, of amplification gain calculated as a function of an estimated excursion value of the loudspeaker, in order to avoid an excessive excursion of the loudspeaker diaphragm. Thus, the method proposed in this patent makes it possible to calculate a suitable amplification gain, and this amplification gain is applied to all the low frequencies of the audio signal. However, this method increases the level including very low frequencies, which contribute to the excursion of the diaphragm of the transducer, while being barely audible by a user.

SUMMARY

The invention relates to further improving the reproduction of the low frequencies of the audio signal while protecting the transducer against possible damage.

For this purpose, according to a first aspect, the invention proposes a method for processing a digital audio signal to improve the rendering of the low frequencies implemented in an audio system including a transducer comprising a magnetic element suitable for generating vibrations based on the frequency of the audio signal and having an associated maximum excursion value, the transducer also having a specific cutoff frequency. This method includes:

A) performing a high-pass filtering of the digital audio signal having an associated filtering frequency, the filtering frequency being greater than or equal to 10 Hz and less than two thirds of the specific cutoff frequency of the transducer, the high-pass filtering producing a filtered digital audio signal, B) applying, to said filtered digital audio signal, a first low shelf filter, said first low shelf filter performing an amplification of the frequencies, comprised in a frequency range that is less than a predetermined limit frequency, said first low shelf filter having a predetermined first amplification gain, C) estimating an excursion value of the transducer for the signal obtained after applying the first low shelf filter, D) if the estimated excursion value of the transducer exceeds the maximum excursion value, calculating a second amplification gain that is less than the first amplification gain, E) applying, to said filtered digital audio signal, a second low shelf filter performing an amplification of the frequencies comprised in said frequency range that is less than the predetermined limit frequency, and of gain equal to the second calculated gain, the application of the second low shelf filter making it possible to obtain a filtered and amplified digital audio signal, for which the transducer has an excursion value that is less than the maximum excursion value.

Advantageously, the proposed method for processing a digital audio signal makes it possible to protect the transducer by avoiding reaching the maximum excursion value and to improve the sound rendering of the frequencies of interest for the user.

The method for processing a digital audio signal to improve the rendering of low frequencies according to the invention may also have one or more of the features hereunder, taken independently or according to all technically conceivable combinations.

The filtering frequency is less than half the specific cutoff frequency of the transducer.

The method a phase of determining said filtering frequency of the high-pass filter to be applied, which comprises applying steps A) to E) a number P of times, P being greater than or equal to two, each application being carried out with a high-pass filtering having a discrete test filtering frequency, selected between 10 Hz and less than two thirds of the specific cutoff frequency of the transducer, each application making it possible to obtain a second amplification gain associated with a test filtering frequency, and then selecting a high-pass filtering to be applied to the digital audio signal with filtering frequency selected from among the test filtering frequencies.

Each application of steps A) to E) makes it possible to obtain a to obtain a filtered and amplified test digital audio signal, and the selection implements a calculation of the power of each filtered and amplified test digital audio signal, and the selection of the test filtering frequency making it possible to obtain the maximum power filtered and amplified test digital audio signal.

The test filtering frequencies comprise P frequency values, comprising a first test filtering frequency equal to 10 Hz, a last test filtering frequency equal to the specific cutoff frequency of the transducer divided by two.

In one embodiment, P is strictly greater than two, and the test filtering frequencies comprise P frequencies regularly distributed between 10 Hz and the specific cutoff frequency of the transducer divided by two.

The test filtering frequencies comprise P frequency values, incremented by an increment of 10 Hz from a selected floor frequency value.

According to another aspect, the invention relates to an audio system including a transducer comprising a magnetic element suitable for generating vibrations based on the frequency of the audio signal and having an associated maximum excursion value, the transducer also having a specific cutoff frequency, the audio system further including a computing unit configured to implement a method for processing a digital audio signal in order to improve the rendering of the low frequencies as briefly described hereinbefore.

The advantages of the audio system are similar to the advantages of the audio processing method recalled hereinbefore.

According to advantageous embodiments: the transducer is a loudspeaker and/or the audio system is integrated into a seat headrest, and/or the transducer is a vibrator, said audio system being integrated into a seat.

BRIEF DESCRIPTION OF THE DRAWINGS

Other features and advantages of the invention will become apparent from the description given hereunder, by way of non-limiting indication, referring to the appended figures, among which.

DETAILED DESCRIPTION

Figure 1:
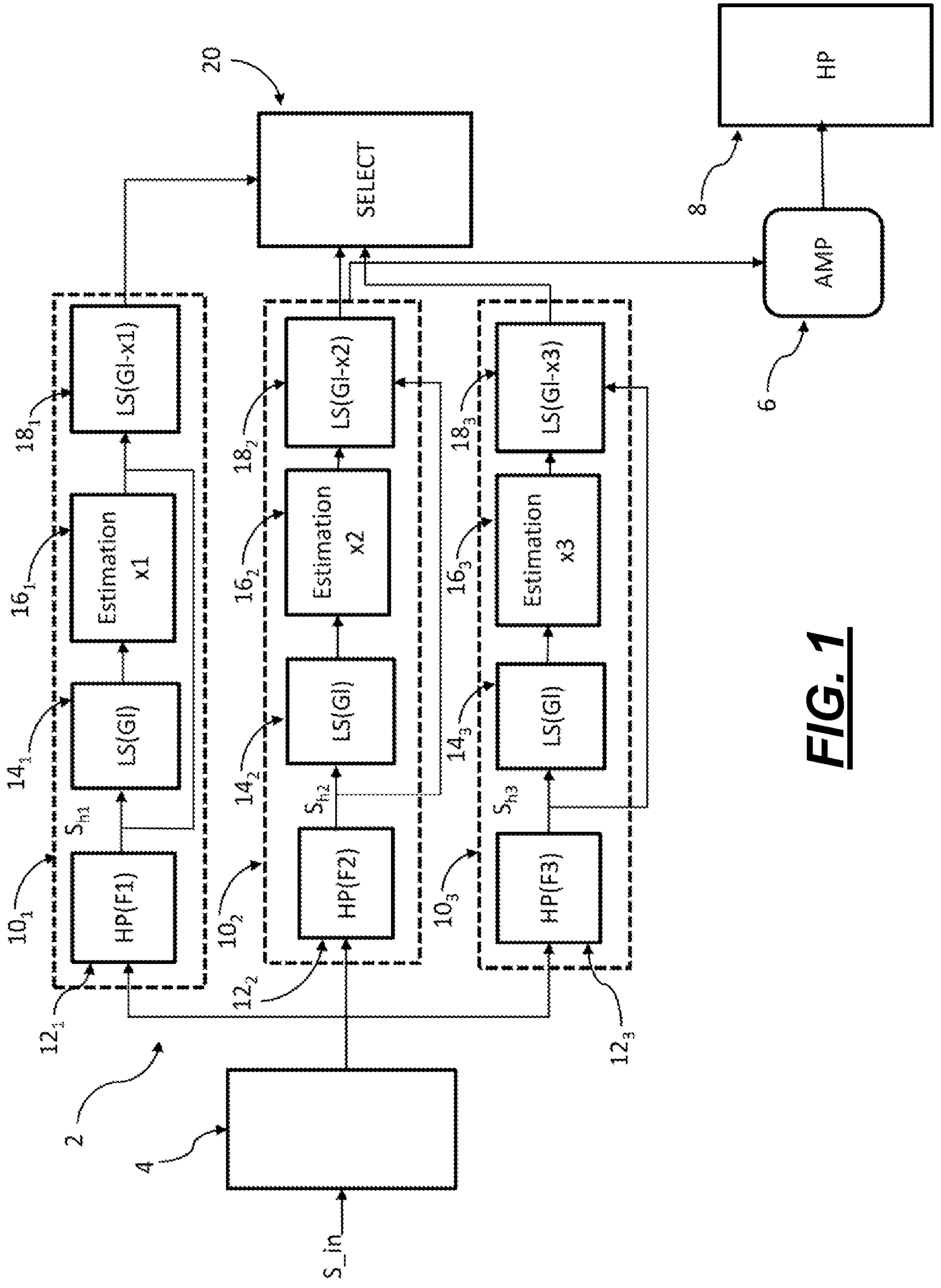
FIG. 1 schematically depicts a system for processing a digital audio signal to improve the rendering of the low frequencies according to one embodiment.

FIG. 1 schematically depicts a system for processing a digital audio signal 2 to improve the rendering of the low frequencies according to one embodiment.

An audio signal S_in is provided as input of a block 4, which applies a gain dependent on the amplifier 6, which will be used at the end of the processing chain, before providing the audio signal to the transducer 8. The audio signal obtained as output of the block 4 is a digital audio signal to which processing operations to enhance sound rendering are applied.

In one embodiment, the transducer 8 is a loudspeaker, which is for example integrated into a seat headrest audio system, more particularly of a transport vehicle seat.

In another embodiment, the transducer 8 is a loudspeaker, which is for example integrated into a mobile telephone audio system.

In another embodiment, the transducer 8 is a vibrator integrated into a seat, for example into a seat, more particularly a transport vehicle seat.

The processing system 2 includes one or more processing chains $\mathbf{10}_1$ to $\mathbf{10}_P$, the example of FIG. 1 including P=3 processing chains.

In the embodiment wherein P is an integer strictly greater than 1, the system implements, substantially in parallel or successively, processing chains $\mathbf{10}_1$ to $\mathbf{10}_P$, any one of these processing chains being referenced $\mathbf{10}_1$.

Each processing chain $\mathbf{10}_1$ implements a test phase to dynamically determine optimized processing parameters of the digital audio signal.

Each processing chain includes a module 121 applying a high-pass filtering of the digital audio signal, having an associated filtering frequency Fi.

Such a high-pass filter performs, in a known manner, a cutoff at the frequency Fi, so as to retain only the frequencies greater than or equal to the filtering frequency Fi. A filtered digital audio signal Shi is thus obtained.

The processing chain 10 further includes a module 14 for applying a first filter of the "low shelf" type, designated by the abbreviation LS.

A low shelf filter is, in a known manner, defined by a limit frequency or cutoff frequency $F_l$, and an amplification gain $G_l$. The low shelf filter produces a gain amplification $G_l$ for frequencies comprised in a frequency range, delimited by the limit frequency $F_l$ above which no amplification is applied. For example, such a filter provides an amplification of $G_l$=+2 dB in a selected frequency range, for example notably less than 100 Hz, and no amplification clearly above 100 Hz. The limit frequency is in the middle of a transition period, the stiffness (or slope) of which is configurable.

For example, each LS filter $\mathbf{14}_i$ has a limit frequency of 130 Hz and a first amplification gain of 5 dB.

The processing chain $\mathbf{10}_i$ also includes a module 161 for estimating a current excursion value of the transducer for the signal obtained after applying the first test low shelf filter 141.

In addition, the module 161 also calculates a correction, or attenuation, xi to be applied to the first amplification gain in order to obtain a second amplification gain $G_2=G_l-xi$ which makes it possible to obtain a current excursion value that does not exceed the maximum excursion value.

Any method for estimating the current value of the excursion of the transducer is applicable, for example the method described in patent EP 2,571,286 B1.

A low shelf LS filter **18*i*** is then applied to the filtered digital audio signal, with the second calculated amplification gain, which makes it possible to obtain a digital signal filtered by the high-pass filtering and amplified by the LS filter $\mathbf{18}_i$.

The system 2 includes, in the case where the number P of processing chains is greater than or equal to two, a module 20 for selecting a high-pass filtering, of filtering frequency Fj, to be applied to the digital audio signal according to the filtered and amplified digital signals obtained respectively by each processing chain $\mathbf{10}_i$.

In one embodiment, the high-pass filter $\mathbf{12}_j$ selected is the one which provides the maximum power filtered and amplified digital signal. The corresponding filtered and amplified digital signal is provided as input to the amplifier 6, and then provided to the transducer 8 for sound reproduction.

The modules $\mathbf{12}_i$ to $\mathbf{18}_i$ of each processing chain and the module 20 are preferably digital processing modules, implemented within a computing unit which is for example a processor, a microcontroller or a digital signal processing chip of the DSP type.

In the embodiment wherein P=1, a single processing chain 10 is implemented, and the filtering frequency is selected between 10 Hz and two thirds of the specific cutoff frequency of the transducer, preferably between 10 Hz and half of the cutoff frequency of the transducer. In this case, the selection module 20 is not implemented.

Figure 2:
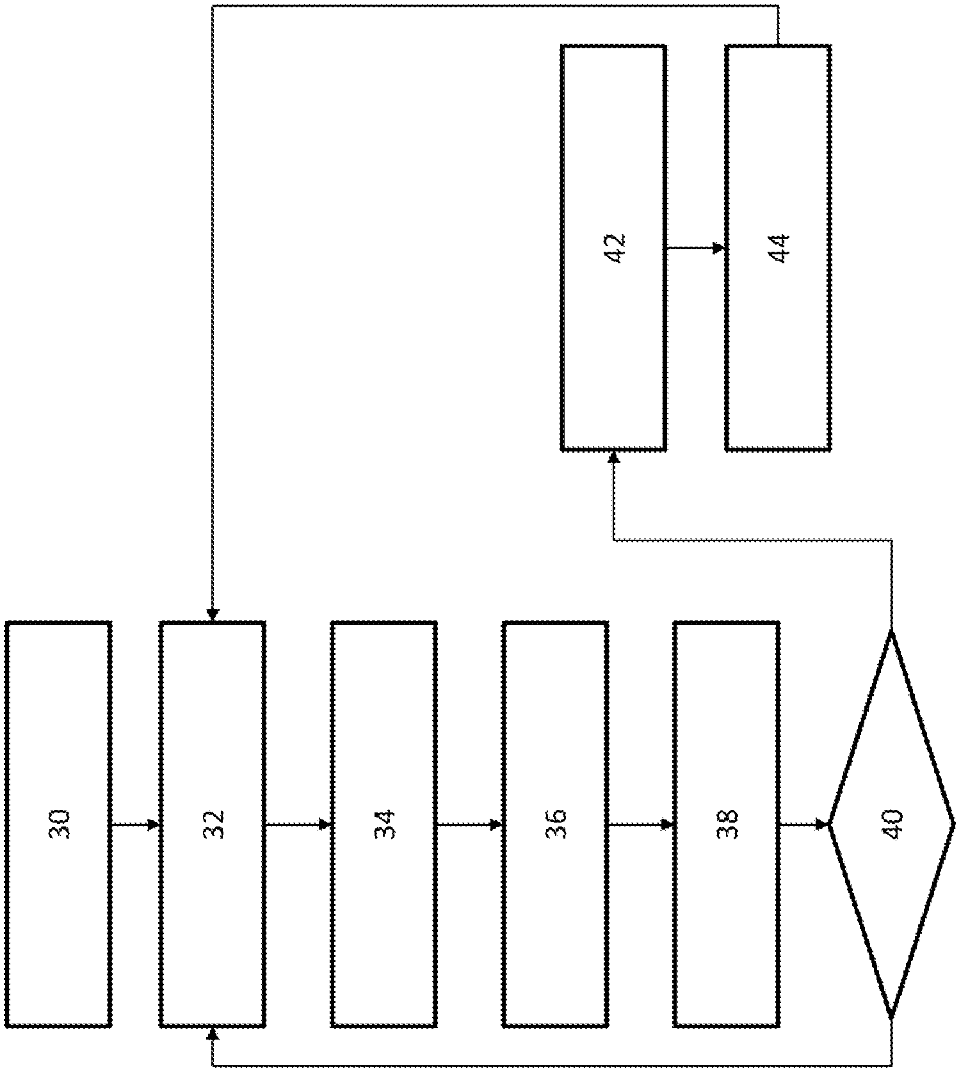
FIG. 2 is a block diagram of a method for processing a digital audio signal to improve the rendering of the low frequencies according to a first embodiment.

FIG. 2 is a block diagram of the main steps of a method for processing a digital audio signal to improve the rendering of the low frequencies in a first embodiment.

The method includes the following steps, implemented on a digital audio signal.

The method includes a step 30 of obtaining parameters, for example from an electronic memory or via a human-machine interface allowing a user to provide parameters.

In particular, these parameters comprise the specific cutoff frequency $F_0$ of the transducer and the maximum excursion value of the transducer.

These parameters also comprise cutoff frequency parameters $F_l$, and an amplification gain $G_l$ for each first LS filter (low shelf filter).

The method includes a step 32 of obtaining the digital audio signal from an analog audio signal, by analog-to-digital conversion, executed continuously, and the application of a gain by the gain block 4.

Step 32 is followed by a step 34 of high-pass filtering the digital audio signal, the high-pass filter having a selected filtering frequency $F_{hp}$.

For example, the filtering frequency $F_{hp}$ is between 10 Hz and ⅔ $F_0$, preferentially between 10 Hz and $F_0/2$.

The filtering step 34 provides a filtered audio signal $S_h$.

The method then comprises a step 36 of applying a first low shelf filter. This filter is characterized by parameters which are the limit frequency $F_l$ and the first amplification gain $G_l$.

For example, $F_l$=130 Hz and $G_l$=5 dB.

The method also comprises a step 38 of estimating an excursion value of the transducer for the signal obtained after applying the first low shelf filter to the filtered digital signal $S_h$.

The estimated excursion value of the transducer is compared in comparison step 40 to the maximum excursion value of the transducer, and if it exceeds this value, step 40 is followed by a step 42 of calculating a second amplification gain, as a function of the first amplification gain and the exceeding of the maximum excursion value of the transducer.

If the estimated excursion value of the transducer is less than the maximum excursion value of the transducer, the method continues in step 32

In one embodiment, step 42 implements the calculation of an attenuation of X dB of the amplification gain to be applied to avoid exceeding the maximum excursion value of the transducer: $G2=G_l-X$ in dB.

For example, if for a first amplification gain $G_l$, the estimated excursion $x(G_l)$ exceeds the excursion limit x_lim, the attenuation value X is calculated by $X=20*\log(x(G_l)/x\_lim)$.

Step 42 is followed by a step 44 of applying a second low shelf amplification filter, having a gain equal to the second amplification gain, and the same frequency limit as the first low shelf filter applied in step 36.

After step 44, a digital audio signal filtered and amplified by the LS filtering is obtained, which is then provided to the transducer for reproduction.

Step 44 and followed by step 32, the processing to improve the rendering of low frequencies being applied in a loop to an audio signal received as input.

Figure 3:
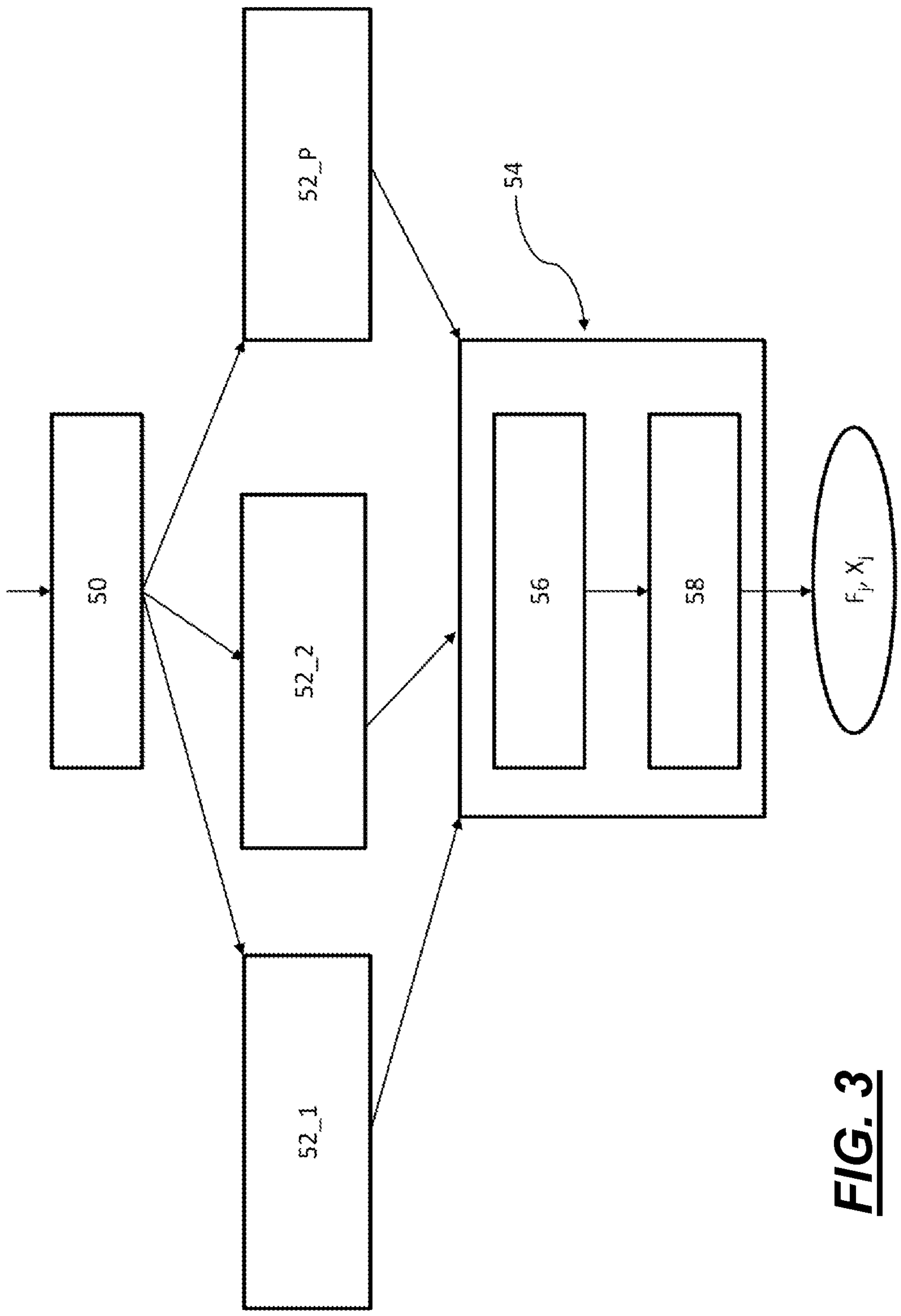
FIG. 3 is a block diagram of a method for processing a digital audio signal to improve the rendering of the low frequencies according to a second embodiment.

FIG. 3 is a block diagram of the main steps of a method for processing a digital audio signal to improve the rendering of the low frequencies in a second embodiment This second embodiment comprises steps of obtaining parameters and acquiring the digital audio signal to be processed, analogous to steps 30 and 32.

The method further comprises a step 50 of determining P values of filtering frequencies of high-pass filters to be tested, referred to as test filtering frequencies and denoted $F_1$ to $F_P$.

For example, given the specific cutoff frequency of the transducer $F_0$ and an integer P selected, for example P=3 or P=4, step 50 involves calculating the pitch $$d=(F_0/2-10)/P$$

and the test filtering frequencies Fi are calculated as follows: $F_1$=10 Hz, and then $$F_{i+1}=(F_i+d)\ \text{Hz}.$$

In other words, in this embodiment, the test filtering frequencies are regularly distributed between the floor frequency value equal to 10 Hz and the specific cutoff frequency of the transducer divided by two.

According to one variant, a floor frequency value different from 10 Hz, for example 15 Hz, is selected, and the calculation described hereinbefore is applied with the floor frequency $F_p$, to obtain test filtering frequencies regularly distributed between the floor frequency and $F_0/2$.

According to another variant, filtering frequencies incremented 10 Hz by 10 Hz, from a floor frequency value, for example equal to 10 Hz, are selected, for example $F_1$=10 Hz, $F_2$=20 Hz, $F_3$=30 Hz, $F_4$=40 Hz, for $F_0$=120 Hz.

According to another variant, for P=4, filtering frequencies of $F_1$=10 Hz, $F_2$=30 Hz, $F_3$=50 Hz, $F_4$=70 Hz are selected, for $F_0$=120 Hz.

Of course, other progression variants, in the form of an arithmetic or geometric series, or other, may be implemented to determine P test filtering frequencies, each test filtering frequency being greater than or equal to the floor frequency value, preferably equal to 10 Hz, and less than two thirds of the specific cutoff frequency of the transducer.

Step 50 is followed by the application of several test processing operations 52_1 to 52_P.

Each of these processing operations implements steps 34 to 44 described with reference to FIG. 2, with, for each processing operation 52_*i*, the implementation of a high-pass filtering of corresponding frequency $F_i$, determined in step 50.

In other words, each test processing operation 52_*i* implements a test filtering frequency $F_i$ and makes it possible to calculate a second shelf filtering gain, corresponding to the first attenuated amplification gain by a value xi calculated to limit the value of the excursion of the transducer to an excursion value that is less than the maximum excursion value.

The method then includes a selection 54 of a high-pass filtering to be applied to the digital audio signal with filtering frequency selected from among the test filtering frequencies $F_1$ to $F_P$.

The selection 54 includes, in one embodiment, a calculation 56 of the power $P_i$ of each filtered and amplified test digital audio signal obtained by the processing operation 52_*i*, and the determination 58 of the processing operation 52_*j* for which the power $P_j$ is maximum.

At the end of the selection step 54, the pair of filtering frequency Fj and gain attenuation xj to be applied are obtained in order to obtain the second low shelf filter LS gain to be applied.

The processing operation 52*j*, implementing a high-pass filtering frequency $F_j$, and an application of a $LS_j$ filter of second gain $GI-x_j$ is implemented.

Advantageously, the method makes it possible to amplify the low or medium frequencies in a self-adaptive manner, while avoiding any degradation of the transducer by virtue of the limitation of the excursion value so as not to exceed the maximum excursion value.

Advantageously, the proposed method makes it possible to improve the reproduction of the audio signal in the low frequencies and in the medium frequencies, without introducing non-linear distortion.

The invention claimed is:

1. A method for processing a digital audio signal to improve the rendering of the low frequencies, implemented in an audio system including a transducer comprising a magnetic element suitable for generating vibrations based on the frequency of the audio signal and having an associated maximum excursion value, the transducer further having a specific cutoff frequency, the method comprising:

A) performing a high-pass filtering of the digital audio signal having an associated filtering frequency, the filtering frequency being greater than or equal to 10 Hz and less than two thirds of the specific cutoff frequency of the transducer, the high-pass filtering producing a filtered digital audio signal, B) applying, to said filtered digital audio signal, a first low shelf filter, said first low shelf filter performing an amplification of the frequencies, comprised in a frequency range that is less than a predetermined limit frequency, said first low shelf filter having a predetermined first amplification gain, C) estimating an excursion value of the transducer for the signal obtained after applying the first low shelf filter, D) when the estimated excursion value of the transducer exceeds the maximum excursion value, calculating a second amplification gain that is less than the first gain, E) applying, to said filtered digital audio signal, a second low shelf filter performing an amplification of the frequencies comprised in said frequency range that is less than the predetermined limit frequency, and of gain equal to the second calculated gain, the application of the second low shelf filter resulting in a filtered and amplified digital audio signal, for which the transducer has an excursion value that is less than the maximum excursion value.

2. The method according to claim 1, wherein said filtering frequency is less than half the specific cutoff frequency of the transducer.

3. The method according to claim 1, comprising a phase of determining said filtering frequency of the high-pass filter to be applied, which comprises applying steps A) to E) a number P of times, P being greater than or equal to two, each application of steps A) to E) being carried out with a high-pass filtering having a discrete test filtering frequency, selected between 10 Hz and less than two thirds of the specific cutoff frequency of the transducer, each application making it possible to obtain a second amplification gain associated with a test filtering frequency, and then selecting a high-pass filtering to be applied to the digital audio signal with filtering frequency selected from among the test filtering frequencies.

4. The method according to claim 3, wherein each application of steps A) to E) results in a filtered and amplified test digital audio signal, and the selection implements a calculation of the power of each filtered and amplified test digital audio signal, and the determination of the test filtering frequency making it possible to obtain the maximum power filtered and amplified test digital audio signal.

5. The method according to claim 3, wherein the test filtering frequencies comprise P frequency values, comprising a first test filtering frequency equal to 10 Hz, a last test filtering frequency equal to the specific cutoff frequency of the transducer divided by two.

6. The method according to claim 5, wherein P is greater than two, and the test filtering frequencies comprise P frequencies regularly distributed between 10 Hz and the specific cutoff frequency of the transducer divided by two.

7. The method according to claim 3, wherein the test filtering frequencies comprise P frequency values, incremented by an increment of 10 Hz from a selected floor frequency value.

8. An audio system including a transducer comprising a magnetic element suitable for generating vibrations based on the frequency of the audio signal and having an associated maximum excursion value, the transducer also having a specific cutoff frequency, the audio system further including a computing unit configured to implement the method of claim 1.

9. The audio system according to claim 8, wherein said transducer is a loudspeaker.

10. The audio system according to claim 9, integrated into a seat headrest.

11. The audio system according to claim 8, wherein said transducer is a vibrator, said audio system being integrated into a seat.

* * * * *